United States Patent
Kanayama (10) Patent No.: US 10,989,292 B2
(45) Date of Patent: Apr. 27, 2021

(54) STRAIN WAVE GEAR DEVICE AND WAVE GENERATOR

(71) Applicant: HARMONIC DRIVE SYSTEMS INC., Tokyo (JP)

(72) Inventor: Naoki Kanayama, Azumino (JP)

(73) Assignee: HARMONIC DRIVE SYSTEMS INC., Tokyo (JP)

(*) Notice: Subject to any disclaimer, the term of this patent is extended or adjusted under 35 U.S.C. 154(b) by 73 days.

(21) Appl. No.: 16/603,405

(22) PCT Filed: Apr. 28, 2017

(86) PCT No.: PCT/JP2017/017030
§ 371 (c)(1),
(2) Date: Oct. 7, 2019

(87) PCT Pub. No.: WO2018/198348
PCT Pub. Date: Nov. 1, 2018

(65) Prior Publication Data
US 2020/0040978 A1 Feb. 6, 2020

(51) Int. Cl.
*F16H 49/00* (2006.01)
(52) U.S. Cl.
CPC ..... *F16H 49/001* (2013.01); *F16H 2049/003* (2013.01)
(58) Field of Classification Search
CPC .................................................. F16H 49/001
(Continued)

(56) References Cited

U.S. PATENT DOCUMENTS 3,196,713 A * 7/1965 Robinson .............. F16H 49/001
74/640
4,969,376 A * 11/1990 Fickelscher ........... F16H 49/001
475/180
(Continued)

FOREIGN PATENT DOCUMENTS

JP      S62209247 A    9/1987
JP      2916012 B2    7/1999
(Continued)

OTHER PUBLICATIONS

International Search Report (PCT/ISA/210) dated Jul. 25, 2017, by the Japan Patent Office as the International Searching Authority for International Application No. PCT/JP2017/017030.
(Continued)

*Primary Examiner* — Ha Dinh Ho
(74) *Attorney, Agent, or Firm* — Buchanan Ingersoll & Rooney PC (57) ABSTRACT

A wave generator of a wave gear device flexes an externally toothed gear into a shape along an elliptical closed curve to form engaging portions of the externally toothed gear with an internally toothed gear at two places, namely at both ends of the major axis, and to move the engaging portions in the circumferential direction. The elliptical closed curve has a non-point symmetric shape. For example, the elliptical closed curve is a line symmetric closed curve that is not symmetric about the minor axis, and is symmetric about only the major axis. In the non-point symmetric state, the engaging portions are formed at both ends in the major axis direction. By selecting different shapes for the engaging portions at the two locations of the major axis, vibration attributed to a secondary angular transmission error component generated along with the rotation of the wave generator can be reduced.

9 Claims, 7 Drawing Sheets

(58) Field of Classification Search
USPC .......................................................... 74/640
See application file for complete search history.

(56) References Cited

U.S. PATENT DOCUMENTS

| | | | | |
|---|---|---|---|---|
| 5,016,491 A * | 5/1991 | Poro | ..................... | F16H 49/001 |
| | | | | 74/640 |
| 8,888,374 B1 * | 11/2014 | Nien | ..................... | F16C 35/067 |
| | | | | 384/513 |
| 8,997,607 B2 * | 4/2015 | Kanai | ................... | F16H 49/001 |
| | | | | 74/640 |
| 9,163,710 B2 * | 10/2015 | Kanai | ................... | F16H 49/001 |
| 9,915,334 B2 * | 3/2018 | Balsiger | ................ | F16H 49/001 |

FOREIGN PATENT DOCUMENTS

| | | | |
|---|---|---|---|
| JP | 4067037 B2 | 3/2008 | |
| JP | 2014190396 A | 10/2014 | |

OTHER PUBLICATIONS

Written Opinion (PCT/ISA/237) dated Jul. 25, 2017, by the Japan Patent Office as the International Searching Authority for International Application No. PCT/JP2017/017030.

\* cited by examiner

STRAIN WAVE GEAR DEVICE AND WAVE GENERATOR

FIELD OF THE INVENTION

The present invention relates to a strain wave gearing, and in particular to a wave generator thereof for flexing an externally toothed gear into a non-circular shape to engage with an internally toothed gear at two or more positions.

BACKGROUND ART

In a strain wave gearing, a flexible external gear is flexed by a wave generator into a non-circular shape so that it is made to mesh with an internally toothed gear at two or more locations that are arranged at equal angular intervals in a circumferential direction. For example, the external gear is flexed into an elliptical shape to form meshing portions with the internally toothed gear at two positions on both ends of the major axis of the elliptical shape. When the external gear is flexed into a three-lobe shape, a meshing portion with respect to the internally toothed gear is formed at three positions at 120° intervals in the circumferential direction In this flexed state, when the wave generator is rotated by a motor or the like, the meshing portions of both gears are moved in the circumferential direction of the internally toothed gear. A relative rotation occurs between the both gears by the amount corresponding to the difference in the number of teeth between the both gears every time the meshing portions of the both gears are rotated by one revolution. When one gear is fixed so as not to rotate, the reduced-speed rotation is taken out from the other gear. The number of teeth of the both gears is an integer multiple of the number of meshing portions.

In an externally toothed gear which is flexed into a non-circular shape by a wave generator, the respective meshing portions have the same shape. For example, when the externally toothed gear is flexed into an elliptical shape and is meshed with the internally toothed gear at two positions, the external gear is flexed into a point-symmetrical elliptical shape having its center as a symmetrical point. The shapes of meshing portions of the externally toothed gear formed on both ends of a major axis are the same. When an externally toothed gear is meshed with an internally toothed gear at three positions, the externally toothed gear is flexed into a shape of a three-fold symmetry whose shape coincides every 120° around the center. The shapes of the three meshing portions in the externally toothed gear becomes the same.

Patent documents 1 and 2 have proposed strain wave gearings, in which a wave generator makes an externally toothed gear to flex elliptically to mesh with an internally toothed gear at two locations. Patent document 1 discloses that, as the contour shape of a wave plug for defining a flexing shape of an externally toothed gear, an egg-shaped curve composed of a cosine component, a mixed arc, a four-force shape, and the like are used. Patent document 2 proposes an elliptical shape of a wave plug represented by a tangent polar coordinate display expression having four or more Fourier expansion terms.

PRIOR ART LITERATURE

Patent Document

Patent document 1: JP 4067037 B
Patent document 2: JP 2916012 B

SUMMARY OF THE INVENTION

Problems to be Solved by the Invention

Here, the externally toothed gear which is flexed into an elliptical shape is meshed with the internally toothed gear at two positions on both ends of the major axis of the elliptical shape, so that each time the wave generator is rotated by one revolution, the major axis (each meshing portion) passes through the same position twice. Each portion of the externally toothed gear in a circumferential direction performs wave motion in which each portion is repeatedly flexed with a constant amplitude in the radial direction. The wave motion is two-cycle vibration per rotation of the wave generator. Therefore, in a strain wave gearing in which an externally toothed gear is flexed into an elliptical shape, vibration component of two cycles per rotation of the wave generator, which is secondary vibration component, is included in an angle transmission error generated in the strain wave gearing, and the secondary vibration component is larger than vibration components of the other orders.

Similarly, when an externally toothed gear is flexed into a three-lobe shape, the externally toothed gear meshes with the internally toothed gear at three positions at an angular interval of 120°, so that each time the wave generator is rotated by one revolution, the meshing portions pass through the same position three times. Each portion in the circumferential direction of the externally toothed gear is subjected to wave motion and is repeatedly flexed with a constant amplitude in the radial direction. The wave motion is a vibration of three cycles per rotation of the wave generator. In this case, an angle transmission error occurring in the strain wave gearing includes vibration component of three cycles per rotation of the wave generator, which is tertiary vibration component and is larger than vibration components of the other orders.

An angle transmission error of a strain wave gearing is generated due to a machining error of tooth parts of both gears, an assembly error such as misalignment or inclination between the wave generator and both gears and other errors. The secondary or tertiary vibration component causes resonance of a device into which the wave gear device is incorporated. This causes a drive system, for example, a conveyance system to perform poor positioning. Further, in applications requiring a high precision of motion trajectory such as a robot arm, due to the vibration component, it is sometimes impossible to realize a drive in a state in which the accuracy is maintained to satisfy the requirement level.

Such a problem may also occur in a case of a strain wave gearing having a rigid externally toothed gear and a flexible internally tooted gear, in which the internally toothed gear is flexed into a non-circular shape to partially mesh with the externally toothed gear.

An object of the present invention is to provide a strain wave gearing and a wave generator thereof, by which it is possible to reduce vibration due to an angle transmission error component that occurs in a period corresponding to the number of meshing portions for each revolution of input rotation.

Means of Solving the Problems

In order to solve the above problems, a strain wave gearing of the present invention includes a rigid gear, a flexible gear which can be meshed with the rigid gear, and a wave generator for flexing the flexible gear into a non-circular shape to form a meshing portion with the rigid gear, and for moving the meshing portion in a circumferential direction of the rigid gear. The wave generator flexes the flexible gear so that the meshing portion of the flexible gear with the rigid gear is formed on two or more locations at equal angular intervals in a circumferential direction of the flexible gear. The meshing portions formed on at least two locations have different shapes from each other.

Each meshing portion of the flexible gear, which is flexed into a non-circular shape, passes through the same position in the circumferential direction of the rigid gear for each rotation of input rotation. The meshing state with respect to the rigid gear is different between the first and second meshing portions having different shapes. Since the first meshing state when the first meshing portion of the flexible gear passes through the same position differs from the second meshing state when the second meshing portion passes through the same position, the way the transmission error occurs (occurrence time, amplitude) is not the same between these meshing portions. As a result, vibration caused by an angle transmission error component can be reduced, the angle transmission error component occurring in a period corresponding to the number of locations of the meshing portions for each rotation of the input rotation.

For example, a strain wave gearing includes a rigid internally toothed gear, a flexible externally toothed gear that can mesh with the internally toothed gear, and a wave generator for flexing the externally toothed gear into a non-circular shape to form a meshing portion of the externally toothed gear with the internally toothed gear on two or more locations at equiangular intervals in a circumferential direction of the externally toothed gear and for moving the meshing portions in a circumferential direction of the internally toothed gear.

In a case in which the externally toothed gear is flexed by the wave generator into a shape along an elliptical closed curve so as to form the meshing portions on two locations, the elliptical closed curve is set to be a closed curve of non-point symmetry. For example, the elliptical closed curve is set to be a closed curve of line symmetry, in which only the major axis of the elliptical closed curve is an axis of symmetry, but the minor axis thereof is not an axis of symmetry.

There is a case in which an externally toothed gear is flexed by a wave generator into a shape along a non-circular closed curve so as to form meshing portions on three locations. In this case, a closed curve which defines the flexing shape of the externally toothed gear has three curve portions of different shapes, the curve portions defining the respective meshing portions.

As the wave generator, it is possible to use such a wave generator as having a rigid wave plug and a wave bearing disposed between a plug outer circumferential surface of the wave plug and an inner circumferential surface of the externally toothed gear. In this case, a non-circular flexing shape of the externally toothed gear is determined by the contour shape of the plug outer circumferential surface. In addition, as the wave generator, it is possible to use such a wave generator as having a plurality of rollers that are brought into contact with the inner circumferential surface of the externally toothed gear to flex the same into a non-circular shape.

Next, the present invention relates to a wave generator for a strain wave gearing, in which the wave generator flexes an externally toothed gear into a shape along an elliptical closed curve to form a meshing portion of the externally toothed gear with an internally toothed gear on two locations on both ends of a major axis of the elliptical closed curve, and the wave generator moves the meshing portions of the externally toothed gear in a circumferential direction of the internally toothed gear. The wave generator of this invention has a rigid wave plug and a wave bearing disposed between a plug outer peripheral surface of the wave plug and an inner peripheral surface of the externally toothed gear. The contour shape of the plug outer peripheral surface is determined based on the elliptical closed curve. In addition, the elliptical closed curve is a line-symmetric closed curve, in which only the major axis thereof is an axis of symmetry, but the minor axis thereof is not an axis of symmetry.

A wave generator for a strain wave gearing according to this invention is provided with a plurality of rollers that are brought into contact with the inner peripheral surface of the externally toothed gear to flex the same into a shape along an elliptical closed curve, and a roller holding member for holding the rollers in different locations along the elliptical closed curve so that the rollers are inscribed in the elliptical closed curve. The elliptical closed curve is a line-symmetric closed curve, in which only the major axis thereof is an axis of symmetry, but the minor axis thereof is not an axis of symmetry.

In the present specification, the "elliptical closed curve" means to include closed curves constituted by a combination of a plurality of elliptical curves having different shapes, a combination of curves such as arcs similar to an elliptic curve, a combination of an elliptic curve and a curve similar to an elliptic curve, and the like.

For example, a curve portion on one side of a minor axis in an elliptical closed curve and a curve portion on the other side of the minor axis are defined by ellipses having different shapes from each other. Both ends of these curve portions are smoothly connected to each other at both ends located on the minor axis, by which the elliptical closed curve is formed. In a more specific example, a curve portion on one side of a minor axis in an elliptical closed curve is defined by a curve disclosed in the above-mentioned Patent document 1 and a curve portion on the other side thereof is defined by a curve disclosed in the above-mentioned Patent document 2, and both ends of these curves are smoothly connected to each other at both end positions of the minor axis to form the elliptical closed curve.

The externally toothed gear is not flexed into a shape along a point symmetric shape about the rotation center thereof, but is flexed, for example, into a shape along an elliptical closed curve that is line symmetric about only a major axis as a symmetric axis. Meshing portions of the gears are formed on both ends in the direction of the major axis, which means that the meshing portions are formed on two locations. Thus, the meshing portion passes twice through the same position in the circumferential direction of the internally toothed gear during one rotation of the wave generator. The meshing state is different between the case where one meshing portion passes and the case where the other meshing portion passes, and the output state (occurrence time, amplitude) of the angle transmission error is not the same. As a result, the vibration caused by the secondary error component of the angle transmission error occurring in two cycles per rotation of the wave generator can be reduced.

MODE FOR CARRYING OUT THE INVENTION

Embodiments of a strain wave gearing to which the present invention is applied will be described below with reference to the drawings. The following embodiments relate to a cup-type strain wave gearing. However, the present invention is similarly applicable to a silk hat-type strain wave gearing and a flat-type strain wave gearing.

Embodiment 1

Figure 1:
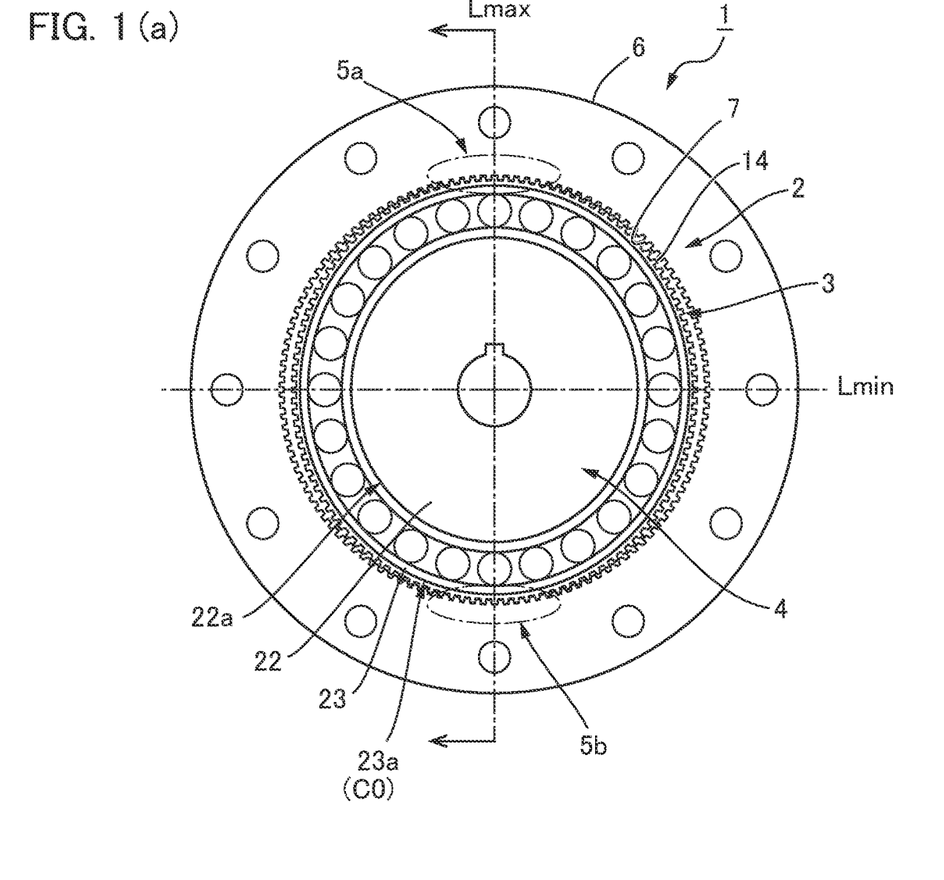
FIG. 1(a) is a schematic end view of a strain wave gearing according to Embodiment 1.
FIG. 1(b) is an explanatory diagram illustrating an elliptical closed curve which defines the flexing shape of an externally toothed gear.
Figure 1B:
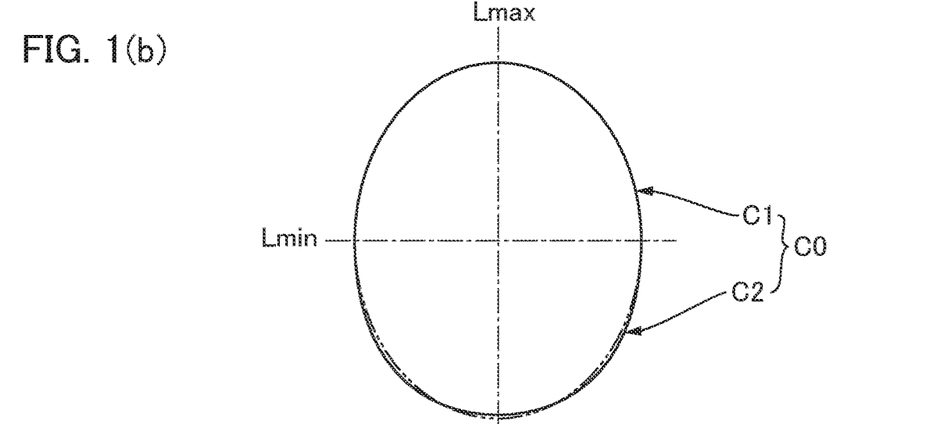
Figure 2:
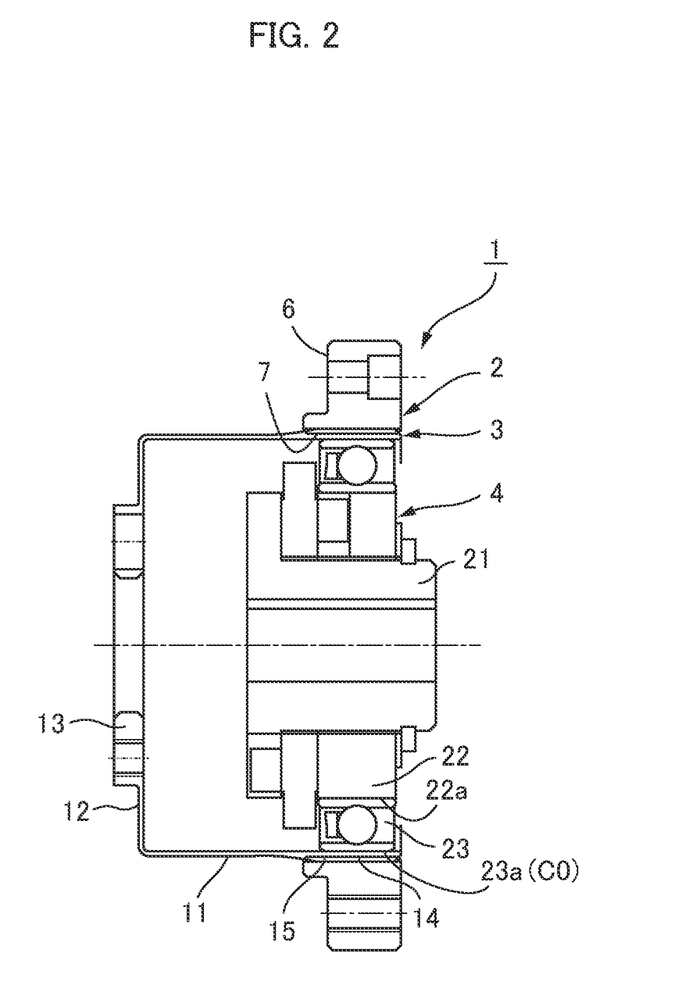
FIG. 2 is a schematic longitudinal sectional view of the strain wave gearing of FIGS. 1(a) and 1(b)

FIG. 1 (a) is a schematic end view of a strain wave gearing according to Embodiment 1, and FIG. 1 (b) is an explanatory diagram illustrating an elliptical closed curve which defines the flexed shape of an externally toothed gear. FIG. 2 is a schematic longitudinal sectional view of a strain wave gearing. As illustrated in these drawings, a strain wave gearing 1 is provided with an annular rigid internally toothed gear 2 (a rigid gear), a cup-shaped flexible externally toothed gear 3 (flexible gear) coaxially disposed inside the internally toothed gear, and a wave generator 4 fitted into the externally toothed gear.

The externally toothed gear 3 is flexed into a shape along an elliptical closed curve C0 by the wave generator 4. The externally toothed gear 3 is formed with meshing portions that mesh with the internally toothed gear 2 at two locations on both ends of the major axis Lmax in the elliptical closed curve C0. Portions surrounded by one-dotted chain lines in FIG. 1(a) indicate these meshing portions 5a and 5b.

When the wave generator 4 is rotated by a motor or the like (not shown), the meshing portions 5a and 5b of the externally toothed gear 3 with the internally toothed gear 2 are moved in the circumferential direction of the internally toothed gear 2. When the meshing portions 5a and 5b are respectively rotated once, relative rotation occurs between both gears 2 and 3 by the difference in the number of teeth of both gears 2 and 3. The difference in the number of teeth between the internally toothed gear 2 and the externally toothed gear 3 is 2n (n is a positive integer), for example, 2 (n=1). In a case where the internally toothed gear 2 is fixed so as not to rotate, the rotation of the wave generator 4 can be taken out from the side of the externally toothed gear 3 as a greatly reduced-speed rotation.

The internally toothed gear 2 is provided with an annular member 6 having a substantially rectangular cross section, and internal teeth 7 formed on the circular inner peripheral surface of the annular member 6. The externally toothed gear 3 is provided with: a cylindrical body part 11 capable of flexing in a radial direction; a disk-like diaphragm 12 extending inward in the radial direction from a rear end of the diaphragm 12; an annular boss 13 which is a rigid body and is connected to the inner peripheral edge of the diaphragm 12; and external teeth 14 formed on an outer peripheral surface portion on the side of an opening end of the cylindrical body part 11.

The wave generator 4 is provided with: a cylindrical hub 21; a wave plug 22 (cam plate) attached to the outer peripheral surface of the hub; and a wave bearing 23 mounted on the outer peripheral surface 22a of the wave plug 22. The outer peripheral surface 22a has a contour shape similar to the elliptical closed curve C0. The wave bearing 23 mounted on the outer peripheral surface 22a has an outer-race outer peripheral surface 23a which is flexed into a contour shape corresponding to the elliptical closed curve C0. The cylindrical body part 11 of the externally toothed gear 3 has an external-tooth forming portion 15 where the external teeth 14 are formed, the external-tooth forming portion being flexed into a shape along the elliptical closed curve C0 corresponding to the contour shape of the outer-race outer peripheral surface 23a.

Here, an example of the elliptical closed curve C0, which defines a shape of the externally toothed gear 3 flexed by the wave generator 4, is constituted by two kinds of elliptic curves as illustrated in FIG. 1(b).

The elliptical closed curve C0 is defined by a first curve portion C1 and a second curve portion C2, the first curve portion defining one side (an upper half portion in FIG. 1(b)) of the minor axis Lmin in the elliptical closed curve and the second curve portion defining the other side (a lower half portion in FIG. 1(b)) of the minor axis Lmin. In FIG. 1(b), a curve that is line-symmetric with the first curve portion C1 with respect to the minor axis Lmin is illustrated by one-dot chain line and the difference between the first and second curve portions C1 and C2 is illustrated in an exaggerated manner.

The first and second curve portions C1 and C2 are elliptic curves that have different shapes but have the same circumferential length and the same-length minor axes. For example, the first curve portion C1 has a portion on and in the vicinity of the major axis Lmax, the curvature of which is larger than that of a portion of the second curve portion C2 on and in the vicinity of the major axis Lmax. The first and second curve portions C1 and C2 are smoothly connected at their ends located on both ends of the minor axis Lmin, so that the elliptical closed curve C0 is formed. The elliptical closed curve C0 has the major axis Lmax as an axis of symmetry (is line-symmetric with respect to the major axis Lmax), but the minor axis thereof is not an axis of symmetry (is not symmetric with respect to the minor axis Lmin).

The externally toothed gear 3 of this embodiment is flexed by the wave generator 4 into a shape along the elliptical closed curve C0. The externally toothed gear 3 in a flexed state meshes with the internally toothed gear 2 on both ends of the major axis Lmax. Specifically, the meshing portions 5a and 5b of the gears 2 and 3 are formed on the both ends of the major axis Lmax. Since the meshing portion of the gears 2 and 3 is formed at two locations, the meshing portion thereof passes twice through the same position in the circumferential direction of the internally toothed gear 2 during one rotation of the wave generator 4.

The meshing portion (the meshing portion 5a in FIG. 1 (a)) formed by the first curve portion C1 of the elliptical closed curve C0 differs in a meshing state from the meshing portion (the meshing portion 5b in FIG. 1(a)) formed by the second curve portion C2 thereof, and the way of output (occurrence time, amplitude) of angle transmission error is not the same therebetween. Thus, the vibration caused by the secondary error component, which is generated in two cycles per one rotation of input (the rotation of the wave generator 4), can be reduced, the secondary error component being included in the angle transmission error of the strain wave gearing 1.

Embodiment 2 (an Example Provided with Roller-Type Wave Generator)

Figure 3A:
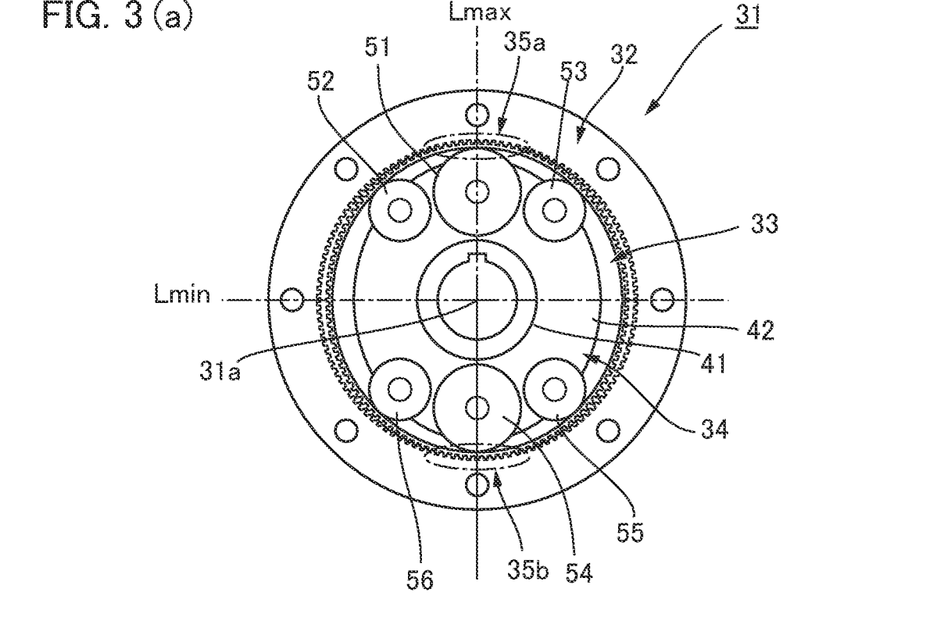
FIG. 3(a) is a schematic end view of a strain wave gearing according to Embodiment 2.
Figure 3B:
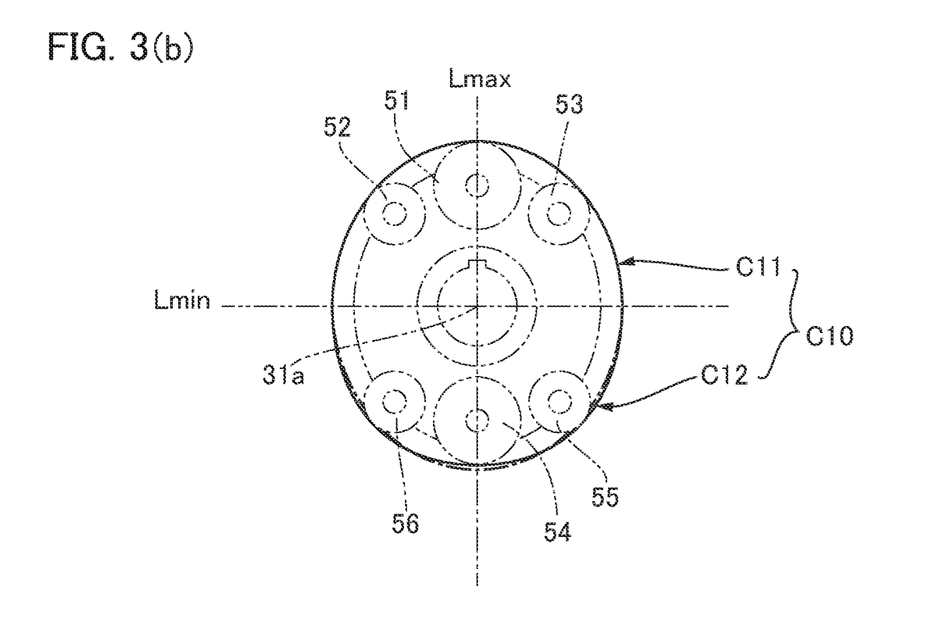
FIG. 3(b) is an explanatory diagram illustrating an elliptical closed curve which defines the flexing shape of an externally toothed gear.
Figure 4:
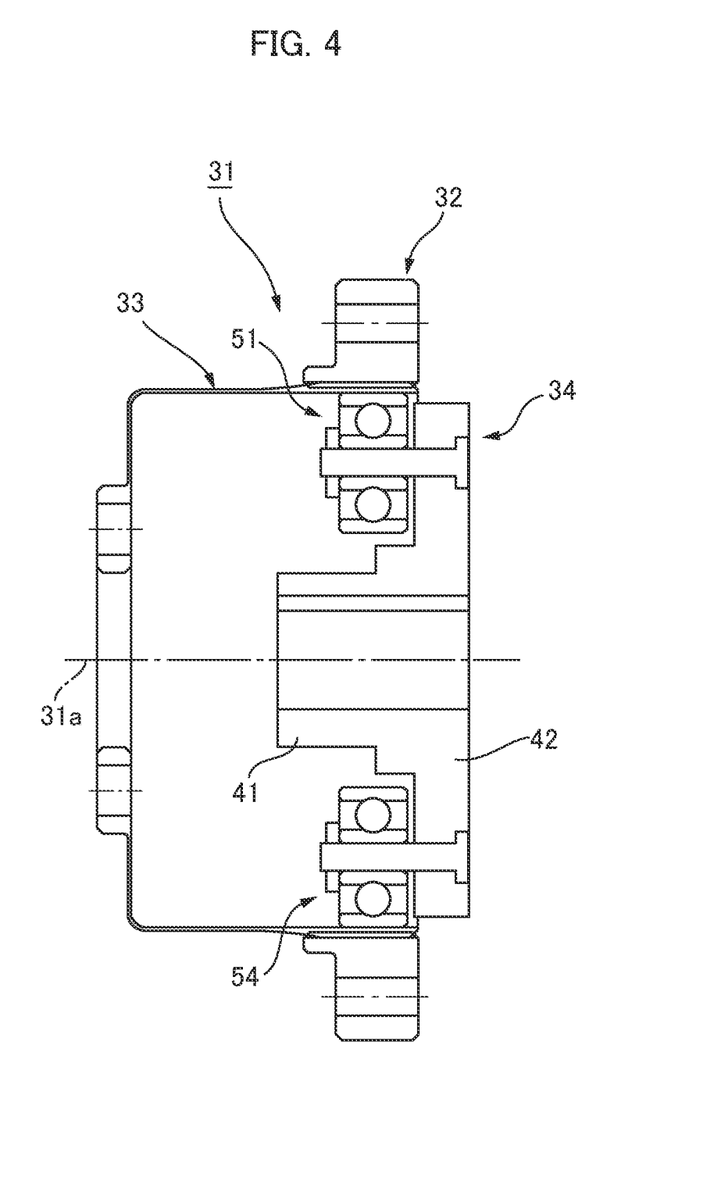
FIG. 4 is a schematic longitudinal sectional view of the strain wave gearing of FIGS. 3(a) and 3(b)

FIG. 3(*a*) is a schematic end view illustrating a strain wave gearing according to Embodiment 2, and FIG. 3 (*b*) is an explanatory diagram illustrating an elliptical closed curve which defines the flexed shape of an externally toothed gear. FIG. 4 is a schematic longitudinal cross-sectional view of a strain wave gearing. A strain wave gearing 31 of Embodiment 2 is provided with: an annular rigid internally toothed gear 32 (a rigid gear); a cup-shaped flexible externally toothed gear 33 (a flexible gear) disposed inside the internally toothed gear 32; and a six-roller type wave generator 34 disposed inside the flexible externally toothed gear 33. The externally toothed gear 33 is flexed by the wave generator 34 into a shape along an elliptical closed curve, so that a meshing portion that meshes with the internally toothed gear 32 is formed at two locations on both end of the major axis Lmax. Portions surrounded by one-dot chain lines in FIG. 3(*a*) are the meshing portions 35*a* and 35*b* of the externally toothed gear 33 meshing with the internally toothed gear 32.

A six-roller type wave generator 34 is provided with: a hollow input shaft 41; a support disk 42 which is a roller holding member and is coaxially fixed to the outer peripheral surface of the hollow input shaft 41 or formed as an integral part with the hollow input shaft 41; and six rollers 51 to 56 attached to the support disk 42. The rollers 51 to 56 are brought into contact with the inner peripheral surface of the external-tooth forming portion of the externally toothed gear 33 from the inside and flex the externally toothed gear 33 into a shape along the elliptical closed curve C10. The rollers 51 to 56 are disposed at positions along the elliptical closed curve C10 centered on the rotation center 31*a* (device center axis line) so as to be inscribed in the elliptical closed curve C10.

As illustrated in FIG. 3(*b*), the elliptical closed curve C10 is defined by a first curve portion C11 and a second curve portion C12, the first curve portion defining one side (an upper half portion in the drawing) of the minor axis Lmin in the elliptical closed curve and the second curve portion defining the other side (a lower half portion in the drawing) of the minor axis Lmin. In FIG. 3(*b*), a curve, which is line-symmetric with the first curve portion C11 with respect to the minor axis Lmin, is indicated by one-dot chain line, and the difference between the first and second curve portions C11 and C12 are illustrated in an exaggerated manner.

For example, the first and second curve portions C11 and C12 are elliptic curves have different shapes, but have the same circumferential length and the same-length minor axes. The first curve portion C11 has a portion on and in the vicinity of the major axis Lmax, the curvature of which is larger than that of a portion of the second curve portion C12 on and in the vicinity of the major axis Lmax. The first and second curve portions C11 and C12 are smoothly connected at their corresponding ends located on both ends of the minor axis Lmin, so that the elliptical closed curve C10 is formed. The elliptical closed curve C10 has the major axis Lmax as an axis of symmetry (is line-symmetric with respect to the major axis Lmax), but the minor axis Lmin thereof is not an axis of symmetry (is not symmetric with respect to the minor axis Lmin).

Among the rollers 51 to 56, the rollers 51, 52 and 53 are disposed at one side (an upper side in the drawing) of the minor axis Lmin and the remaining rollers 54, 55 and 56 are disposed at the other side thereof. The roller 51 is located on the major axis Lmax, while the rollers 52 and 53 are of the same size and are disposed on positions which are line-symmetric with each other with respect to the major axis Lmax. Likewise, the roller 54 is locate don the major axis Lmax, and the rollers 55 and 56 are of the same size and are disposed on positions which are line-symmetric with each other with respect to the major axis Lmax.

For example, the roller 51 and the roller 54 are of the same size, but the distances form the roller centers of these rollers to the rotation center 31*a* (device center axis line) are slightly different from each other, and the roller centers of these rollers are disposed at positions which are non-point symmetric with each other. The roller 52 and the roller 55 are of the same size, but the distances from the roller centers of these rollers to the rotation center 31*a* (device center axis line) are slightly different from each other, and the roller centers of these rollers are disposed at positions which are non-point symmetric with each other. Likewise, the roller 53 and the roller 56 are of the same size, but the distances form the roller centers of these rollers to the rotation center 31*a* (device center axis line) are slightly different from each other, and the roller centers of these rollers are disposed at positions which are non-point symmetric with each other. The elliptical closed curve C10 of non-point symmetry can also be defined by changing the size of the rollers.

The elliptical closed curve C10 defined by these rollers 51 to 56 has a shape that is unsymmetrical with respect to the rotation center 31*a*, as described above. Specifically, the curve has a shape that is line-symmetric with respect to the major axis Lmax but is unsymmetrical with respect to the minor axis Lmin.

Also in the strain wave gearing 31 of this embodiment, the meshing portion (the meshing portion 35*a* in FIG. 3(*a*)) defined by the first curve portion C11 of the elliptical closed curve C10 differs in a meshing state from the meshing portion (the meshing portion 35*b* in FIG. 3(*a*)) defined by the second curve portion C12 thereof, and the state of output (occurrence time, amplitude) of angle transmission error is not the same from each other. Thus, the vibration caused by the secondary error component, which is generated in two cycles per one rotation of input (the rotation of the wave generator 34), can be reduced, the secondary error component being included in the angle transmission error of the strain wave gearing 31.

Embodiment 3

Figure 5:
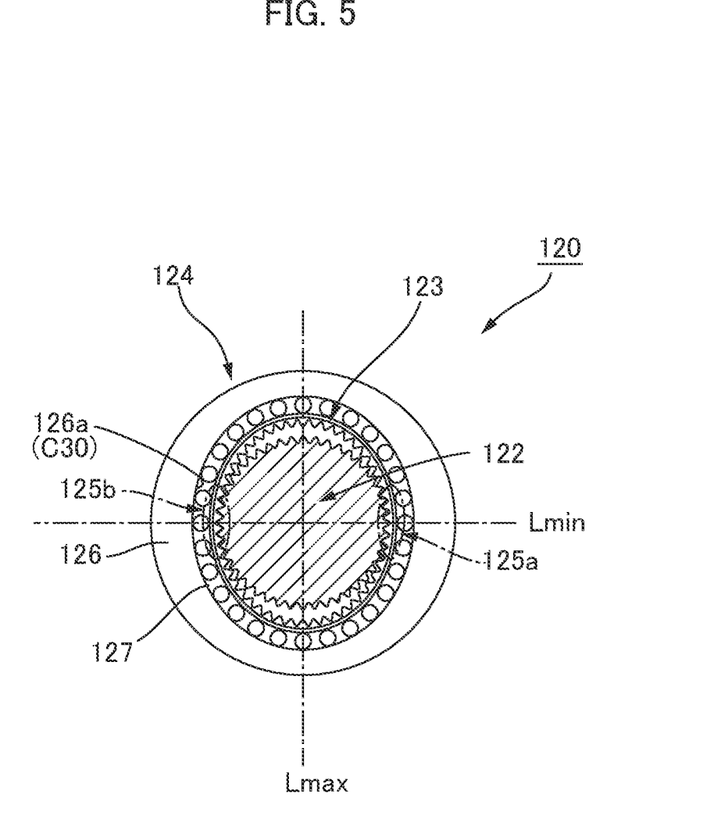
FIG. 5 is an explanatory diagram illustrating a strain wave gearing according to Embodiment 3 of the present invention.

FIG. 5 is an explanatory diagram illustrating a strain wave gearing according to Embodiment 3 to which the present invention is applied. A strain wave gearing 120 has a rigid externally toothed gear 122 (a rigid gear) that is disposed on the innermost side. An annular flexible internally toothed gear 123 (a flexible gear) is arranged in a manner concentrically surrounding the externally toothed gear 122. An annular wave generator 124 is disposed in a manner concentrically surrounding the internally toothed gear 123.

The internally toothed gear 123 is flexed into a shape along an elliptical closed curve C30 which is, for example, similar to the elliptical closed curve C0 in the case of Embodiment 1. The internally toothed gear 123, which is flexed by the wave generator 124, is formed with meshing portions 125*a* and 125*b* meshing with the externally toothed gear 122, the meshing portions being at locations on both ends of the minor axis Lmin in the elliptical closed curve C30. The meshing portions 125a and 125b are those surrounded by one-dot chain lines in FIG. 5.

The wave generator 124 is provided with an annular rigid cam plate 126 and a wave bearing 127 mounted inside the rigid cam plate. The wave bearing 127 has an outer race integrally formed with the rigid cam plate 126 in the illustrated embodiment. The rigid cam plate 126 has a non-circular inner peripheral surface 126a that is defined by the elliptical closed curve C30.

The internally toothed gear 123 disposed inside of the wave generator 124 is flexed thereby into an elliptical shape, so that internal teeth positioned on both ends of the minor axis Lmin in the elliptical shape are meshed with external teeth of the externally toothed gear 122 disposed on the inner side. For example, when the wave generator 124 is rotated by a rotary drive source such as a motor and the externally toothed gear 122 is fixed so as not to rotate, the meshing positions of both gears 122 and 123 are moved in the circumferential direction, and relative rotation corresponding to the difference in the number of teeth of both gears is generated between the both gears. This rotation can be taken out from the internally toothed gear 123.

The elliptical closed curve C30 has curve portions on both ends of the minor axis and the curve portions have different shapes. The meshing portions 125a and 125b of the internally toothed gear 123 flexed by these curve portions also have different shapes. As a result, a meshing state with respect to the externally toothed gear 122 is different between the meshing portions 125a and 125b, and the way of output (occurrence time, amplitude) of angle transmission error is not the same from each other. Thus, the vibration caused by the secondary error component, which is generated in two cycles per one rotation of input can be reduced, the secondary error component being included in the angle transmission error of the strain wave gearing 120.

Embodiment 4

Figure 6:
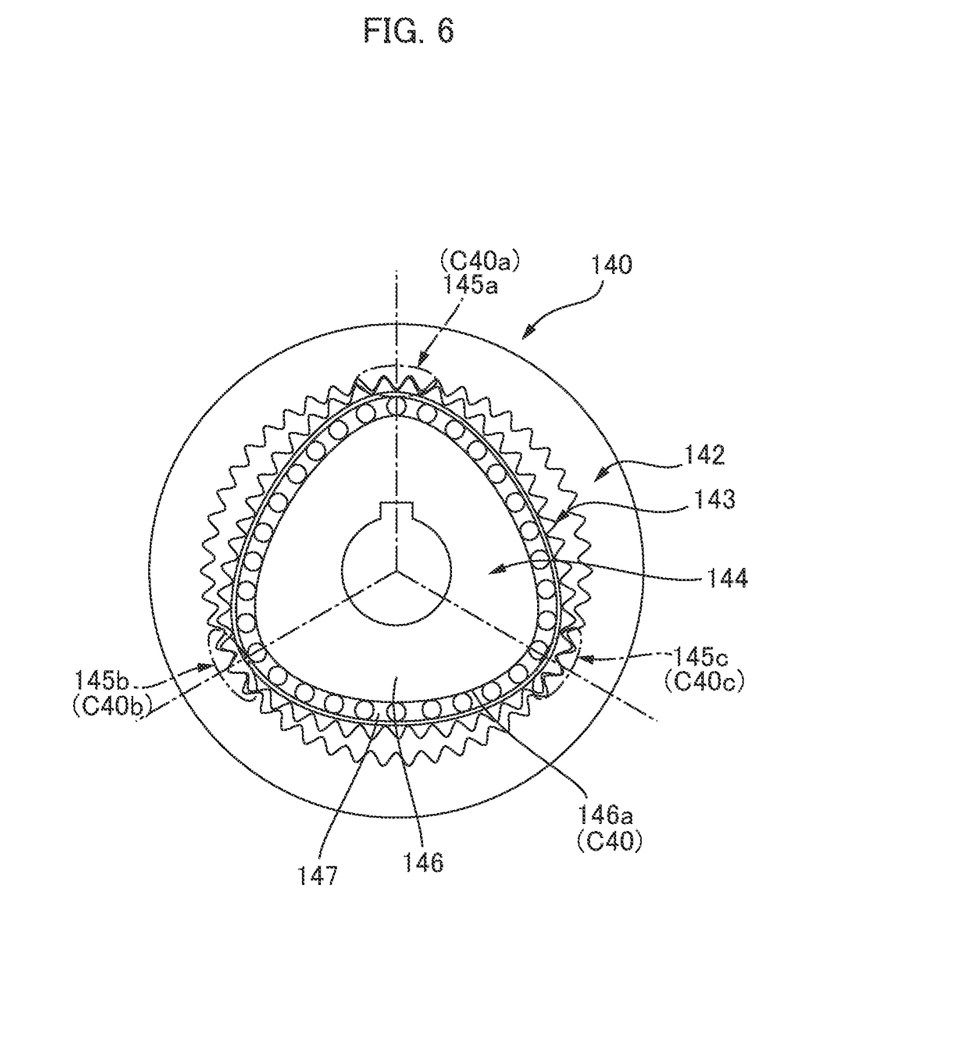
FIG. 6 is an explanatory diagram illustrating a strain wave gearing according to Embodiment 4 of the present invention.

FIG. 6 is an explanatory diagram illustrating a strain wave gearing according to Embodiment 4. A strain wave gearing 140 is provided with a rigid internally toothed gear 142 (a rigid gear), a flexible externally toothed gear 143 (a flexible gear); and a non-circular contoured wave generator 144 fitted to the inside of the externally toothed gear. The externally toothed gear 143 has a portion where external teeth are formed, the portion being flexed by the wave generator 144 into a non-circular shape.

The wave generator 144 is provided with a rigid cam plate 146 having a non-circular contour, and a wave bearing 147 mounted on the outer periphery of the rigid cam plate. The rigid cam plate 146 has a non-circular outer peripheral surface 146a defined by a closed curve which can be inscribed in a true circle at a plurality of positions at equiangular intervals along the circumferential direction of the true circle. In this embodiment, the non-circular outer peripheral surface 146a is of a three-leaf shape (three-lobe shape) and is defined by a closed curve C40 which can be inscribed in a true circle at three positions located at equiangular intervals along the circumferential direction of the true circle. The non-circular outer peripheral surface can be defined by a closed curve which can be inscribed in a true circle at four or more positions located at equiangular intervals along the circumferential direction of the true circle.

The externally toothed gear 143 is flexed by the above-shaped wave generator 144 into a shape along an non-circular contour of the wave generator 144, whereby three meshing portions 145a, 145b and 145c with respect to the internally toothed gear 142 are formed at an angular interval of 120 degrees. The closed curve C40, which defines the non-circular outer peripheral surface 146a of the rigid cam plate 146 of the wave generator 144, has three curve portions C40a, C40b and C40c forming the meshing portions 145a, 145b and 145c, and the shapes of these curve portions are set to be different from one another. As a result, the meshing portions 145a, 145b and 145c at three positions are different from one another in their meshing states with the internally toothed gear 142.

The wave generator 144 is connected to a high-speed-rotation input shaft such as a motor shaft. When the wave generator 144 rotates, the meshing positions between the both gears 142 and 143 move in the circumferential direction, whereby relative rotation is generated between the both gears 142 and 143, the relative rotation being caused by the different in the number of teeth between the gears. For example, the internally toothed gear 142 is fixed so as not to rotate, the externally toothed gear 143 is connected to a load-side member, and reduced-speed rotation is taken out from the externally toothed gear 143 and transmitted to the load-side member. In this case, the difference in the number of teeth between the both gears 142 and 143 is set 3n (n is a positive integer).

Among the three meshing portions 145a, 145b and 145c of the externally toothed gear 143 with respect to the internally toothed gear 142, meshing states thereof are different, and the way of output (occurrence time, amplitude) of angle transmission error is not the same. Thus, the vibration caused by the tertiary error component, which is generated in three cycles per one rotation of input can be reduced, the tertiary error component being included in the angle transmission error of the strain wave gearing 140.

Embodiment 5

Figure 7:
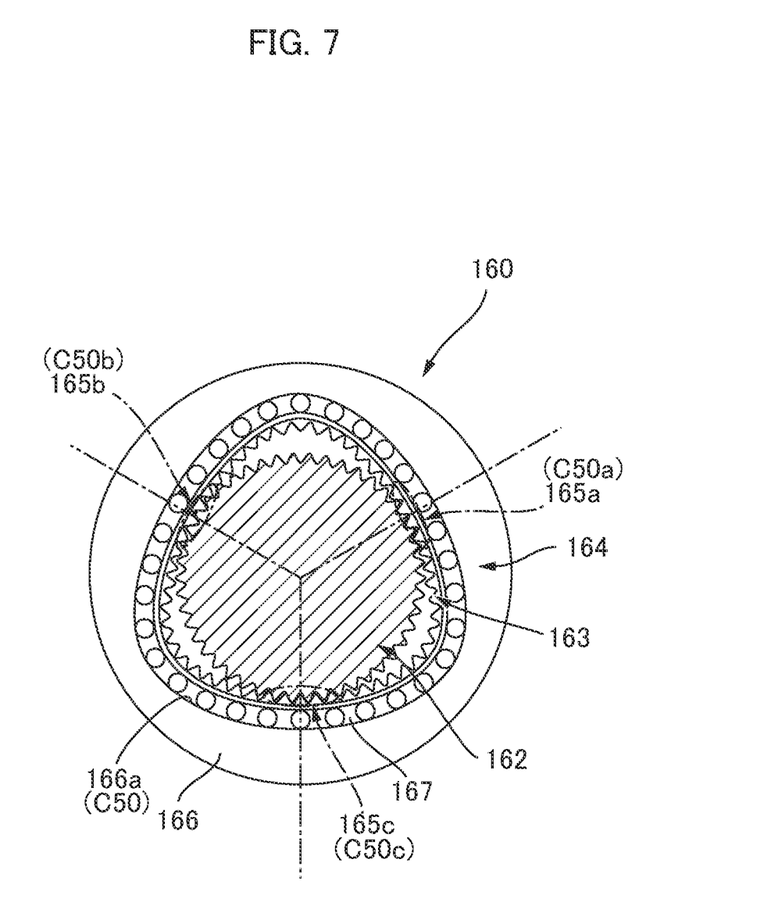
FIG. 7 is an explanatory diagram illustrating a strain wave gearing according to Embodiment 5 of the present invention.

FIG. 7 is an explanatory diagram illustrating a strain wave gearing according to Embodiment 5. In a strain wave gearing 160 as illustrated in this figure, a flexible internally toothed gear 163 (a flexible gear) is disposed on the outer side of a rigid externally toothed gear 162 (a rigid gear), and a wave generator 164 provided with a non-circular inner peripheral surface is disposed on the outer side of the internally toothed gear 163.

The wave generator 164 is provided with a rigid cam plate 166 having a non-circular inner peripheral surface 166a; and a wave bearing 167 mounted on the non-circular inner peripheral surface 166a. The non-circular inner peripheral surface 166a of the rigid cam plate 166 is defined by a closed curve which can be circumscribed in a true circle at a plurality of positions at equiangular intervals along the circumferential direction of the true circle. In this embodiment, the non-circular inner peripheral surface 166a is a three-leaf shape (three-lobe shape) and is defined by a closed curve C50 which can be circumscribed in a true circle at three positions at equiangular intervals along the circumferential direction of the true circle. It is also possible for the non-circular inner peripheral surface to be defined by a closed curve which can be circumscribed in a true circle at four or more positions at equiangular intervals along the circumferential direction of the true circle.

The internally toothed gear 163 is flexed by the above-shaped wave generator 164 into a shape along a non-circular contour of the wave generator 164, whereby the meshing portions 165a, 165b and 165c with respect to the externally toothed gear 162 are formed at three positions at an angular interval of 120 degrees. The closed curve C50, which defines the non-circular inner peripheral surface 166*a* of the wave generator 164, has three curve portions C50*a*, C50*b* and C50*c* forming the meshing portions 165*a*, 165*b* and 165*c* at three positions and the shapes of these curve portions are different from one another. As a result, the meshing portions 165*a*, 165*b* and 165*c* are different from one another in their meshing state with the externally toothed gear 162.

For example, in a case in which the wave generator 164 is rotated by a motor or another rotary drive source and the externally toothed gear 162 is fixed so as not to rotate, the meshing positions between the both gears 162 and 163 move in the circumferential direction and relative rotation is generated between the both gears in accordance with the difference in the number of teeth between the gears. This relative rotation can be extracted from the internally toothed gear 163. The difference in the number of teeth between the both gears 162 and 163 is set 3*n* (n is a positive integer) in this case.

Among the three meshing portions 165*a*, 165*b* and 165*c* of the internally toothed gear 163 with respect to the externally toothed gear 162, their meshing states are different, and the way of output (occurrence time, amplitude) of the angle transmission error is not the same. Accordingly, it is possible to reduce vibrations due to tertiary error component that occurs in three cycles per one rotation of input, the tertiary error component being included in the angle transmission error of the strain wave gearing 160.

Another Embodiments

As described before, the present invention is applicable not only to a cup-type strain wave bearing but also to a silk-hat type strain wave gearing and a flat-type strain wave gearing in a similar manner.

In addition, in the above Embodiments 1, 2 and 3, it is sufficient that the elliptical closed curve be a shape of non-point symmetry, and a variety of shapes can be adopted as the first and second curve portions defining the elliptical closed curve. For example, a combination of a plug shape proposed in Patent document 1 and that proposed in Patent document 2 can be adopted. Two types of plug shapes, which are selected from conventional plug shapes described in Patent document 1, can also be adopted.

The invention claimed is:

1. A strain wave gearing comprising:
   a rigid gear;
   a flexible gear capable of meshing with the rigid gear; and
   a wave generator for flexing the flexible gear into a non-circular shape to form a meshing portion thereof meshing with the rigid gear and for moving the meshing portion in a circumferential direction of the rigid gear,
   wherein the wave generator is configured so that it flexes the flexible gear to form the meshing portion on at least two positions at equal angular intervals in a circumferential direction of the flexible gear, and
   the meshing portions formed on at least the two locations have different shapes from one another.

2. The strain wave gearing according to claim 1,
   wherein the rigid gear is an internally toothed gear, and the flexible gear is an externally toothed gear.

3. The strain wave gearing according to claim 2,
   wherein the wave generator is configured to flex the externally toothed gear into a shape along an elliptical closed curve so that the meshing portion is formed on two locations, and
   the elliptical closed curve is a non-point symmetric curve.

4. The strain wave gearing according to claim 3,
   wherein the elliptical closed curve is a line symmetric closed curve that is not symmetric about a minor axis of the elliptical closed curve and is symmetric about only a major axis thereof.

5. The strain wave gearing according to claim 2,
   wherein the wave generator is configured to flex the externally toothed gear into a shape along a non-circular closed curve so that the meshing portion is formed on three locations, and
   the non-circular closed curve has three curve portions to form the respective meshing portions on the three locations, the three curve portions having different shapes from one another.

6. The strain wave gearing according to claim 2,
   wherein the wave generator comprises rigid wave plug and a wave bearing, the wave bearing being mounted between a plug outer peripheral surface of the wave plug and an inner peripheral surface of the externally toothed gear; and
   the plug outer peripheral surface has a contour shape to define a non-circular flexing shape of the externally toothed gear.

7. The strain wave gearing according to claim 2,
   wherein the wave generator comprises a plurality of rollers that are in contact with an inner peripheral surface of the externally toothed gear and flex the externally toothed gear into the non-circular shape.

8. A wave generator for a strain wave gearing, the wave generator being configured so that it flexes an externally toothed gear into a shape along an elliptical closed curve to form a meshing portion meshing with an internally toothed gear on two locations on both ends of a major axis of the elliptical closed curve, and moves the meshing portions in a circumferential direction of the internally toothed gear, the wave generator comprising:
   a rigid wave plug; and
   a wave bearing mounted between a plug outer peripheral surface of the wave plug and an inner peripheral surface of the externally toothed gear,
   wherein the plug outer peripheral surface has a contour shape that is defined based on the elliptical closed curve, and
   the elliptical closed curve is a line symmetric closed curve that is not symmetric about a minor axis of the elliptical closed curve and is symmetric about only a major axis thereof.

9. A wave generator for a strain wave gearing, the wave generator being configured so that it flexes an externally toothed gear into a shape along an elliptical closed curve to form a meshing portion meshing with an internally toothed gear on two locations on both ends of a major axis of the elliptical closed curve, and moves the meshing portions in a circumferential direction of the internally toothed gear, the wave generator comprising:
   a plurality of rollers that are in contact with an inner peripheral surface of the externally toothed gear so as to flex the externally toothed gear into a shape along the elliptical closed curve; and
   a roller holding member that holds the plurality of rollers on different locations along the elliptical closed curve so as to inscribe on the elliptical closed curve, wherein the elliptical closed curve is a line symmetric closed curve that is not symmetric about a minor axis of the elliptical closed curve and is symmetric about only a major axis thereof.

* * * * *